Nov. 15, 1949  H. J. UNDERWOOD  2,488,450
COLLAPSIBLE PERAMBULATOR
Filed Oct. 30, 1945
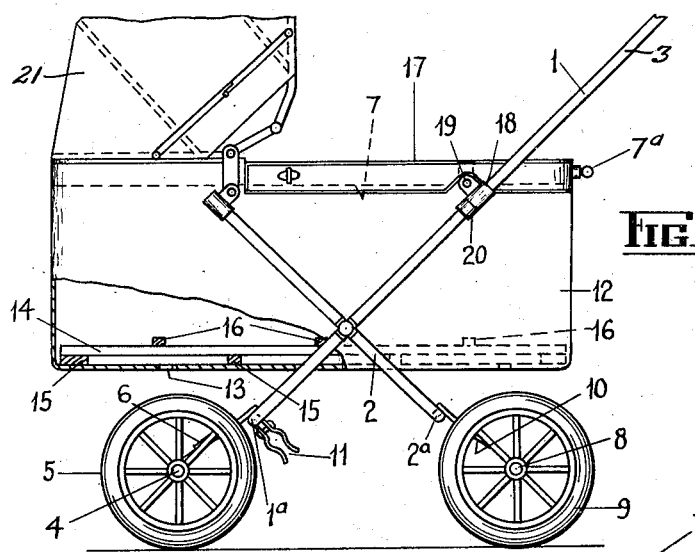
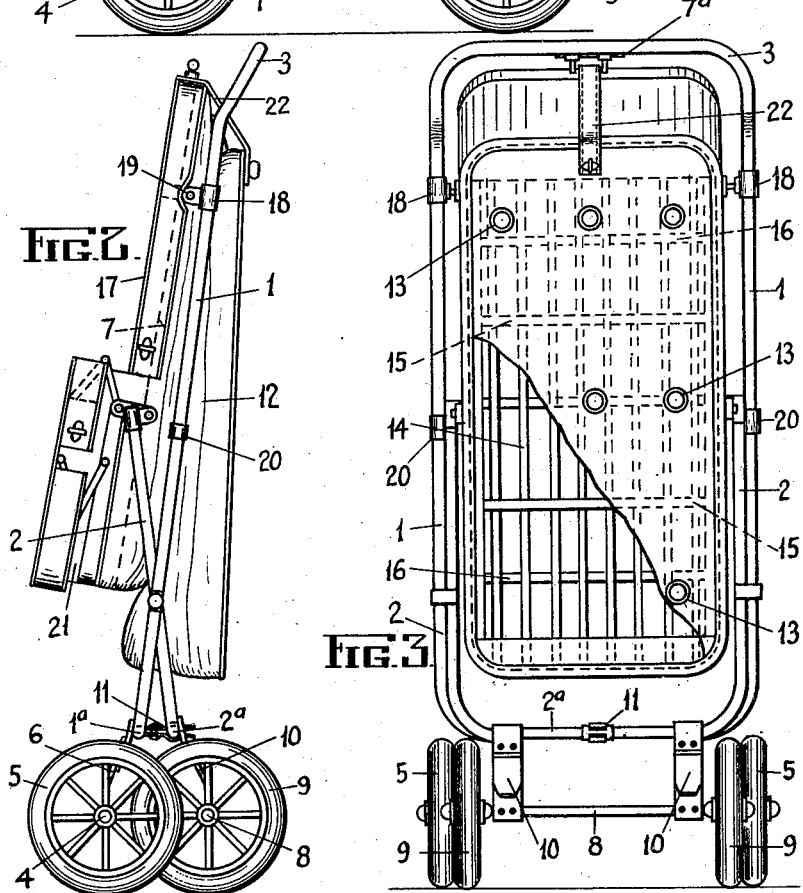
Inventor
H. J. Underwood
By Glascock Downing Seebirth Attys.

Patented Nov. 15, 1949

2,488,450

UNITED STATES PATENT OFFICE 2,488,450

COLLAPSIBLE PERAMBULATOR

Harold Jack Underwood, Wellington, New Zealand, assignor to Underwoods Patents Ltd., Wellington, New Zealand, a company of New Zealand Application October 30, 1945, Serial No. 625,499
In New Zealand October 9, 1944

Section 1, Public Law 690, August 8, 1946
Patent expires October 9, 1964

1 Claim. (Cl. 280—36)

The invention relates to perambulators of the type designed to collapse or fold up, for the purpose of reducing their bulk and occupying as little space as possible during transport on public conveyances and the like, and to facilitate storage when not being used.

The object of the invention, is to provide for the aforesaid purpose, an improved form of collapsible perambulator, which is of comparatively simple construction, is easily collapsed and opened out, as required, is rigid and efficient in use, and when collapsed occupies a minimum of space.

The improved peramulator provided by the invention, comprises, a combined handle and leg member; a leg member crossing and pivoted thereto; a body pivoted to said leg member and slidable on the combined handle and leg member, and wheels mounted on the lower portions of the latter and the leg member.

The invention is illustrated in the accompanying drawing and will be more particularly described in conjunction therewith, Figure 1 being a side view (broken) of the improved perambulator opened out for use, and Figure 2 is a side view, and Figure 3 a rear view (broken) of the perambulator, collapsed or folded.

The combined handle and leg member 1 comprises a frame having forwardly and downwardly extending parallel side portions, an upper cross or connecting bar which serves as the handle 3 of the perambulator, and a lower cross or connecting bar 1a to which the axle 4 of the front wheels 5 of the perambulator is secured by means of leaf springs 6.

The leg member 2 which crosses and is pivoted to the combined handle and leg member 1 is provided by parallel rearwardly and downwardly extending side portions connected together by a lower cross or connecting bar 2a, the body supporting frame 7 being pivoted to and between the upper ends of the parallel side portions of said leg member 2, and also being slidably and pivotally connected with the combined handle and leg member 1, the axle 8 of the rear wheels 9 of the perambulator being secured by means of leaf springs 10, on the lower cross or connecting bar 2a of the leg member 2.

The fittings by means of which the body supporting frame 7 is slidably attached to the combined handle and leg member 1, can comprise sleeves 18 slidable on the parallel portions of said member 1, and formed or provided with lugs 19 to which the frame 7 is pivoted, stops 20 being provided on said parallel portions to limit downward movement of the frame 7 thereon.

The spacing of the wheels 5, 9, crossways of the perambulator is such, that when the latter is collapsed, the front and the rear wheels 5, 9 overlap, also there is provided on the lower cross or connecting bar 1a aforesaid, a spring clip or catch 11 between the jaws of which the other lower cross or connecting bar 2a is forced and gripped to retain the perambulator in its collapsed or folded condition, but from which the engaged cross or connecting bar 2a can be readily detached when it is desired to open out the perambulator for use, the body supporting frame 7 being provided at its rear end with a handle or gripping means 7a, to facilitate the collapsing and opening out of the perambulator.

The body 12 of the perambulator, which is preferably of fabric or other collapsible material, has ventilating holes or openings 13 in its bottom, and has also fitted therein a frame or false bottom 14 with openings therein adapted to support bedding or the like placed in the body 12, up off the bottom thereof, and in one form said frame can conveniently comprise spaced bars, connected together by under bars 15, which when the perambulator is in use support the spaced bars off the bottom of the body 12, and provide for an air space or spaces between said bottom and the bedding or the like.

Also provided on the upper side of the aforesaid frame or false bottom 14 placed in the body 12 are spaced cross ribs 16, which when the perambulator is collapsed or folded with bedding or the like therein, tend to prevent the latter from slipping downwards, owing to said bedding or the like being pressed against said ribs 15 by the cover 17 secured over the body before collapsing or folding the perambulator, said cover 17 being detachably secured to the body supporting frame 7 by means of turn buttons or other suitable fastening means.

The formation of the bottom of the body 12 with holes or openings 13 therein and the provision of the bedding or the like supporting frame or false bottom 14 in said body, although primarily intended for use in collapsible perambulators, can also be used in non-collapsible cots, cribs or the like, and in forms of the latter adapted to fold or collapse, the frame or false bottom 14 can be in sections hinged or jointed to fold or collapse with the cot, crib or the like, and provided with stops or other means to maintain the frame or false bottom in a rigid opened out position for use.

The frame or false bottom 14 can be secured to the body of the perambulator, cot, crib or the like either permanently, or so as to be capable of being removed, when desired.

A hood 21, preferably collapsible, can be pivoted on the body supporting frame 7, and is fitted so as to collapse thereover.

A strap 22 secured to the frame 7 and capable of being attached to and detached from the bottom of the body 12 as required, is provided to enable the latter to be retained collapsed in as small a space as possible when the perambulator is collapsed or folded for transport or storage.

What I do claim and desire to obtain by Letters Patent of the United States of America is:

A collapsible perambulator including a combined handle and leg member constructed in the form of an open rectangular frame of rod metal and composed of side and end portions, a leg member crossing and pivoted thereto and constructed in the form of a U-shaped frame of rod metal having side portions and a lower connecting portion, the U-frame being of slightly less width than the first frame so as to be swung partly into the latter at times, a collapsible body including an open rectangular rigid carrying frame having side and end portions and pivoted near its front end portions and between and to the upper ends of the sides of the U-shaped leg member, fittings in the form of sleeves slidable on the sides of the frame of the combined handle and leg member, lugs on the sleeves to which the sides of the frame of the body are also pivoted at points near the rear end portions, stops on the leg member to limit the downward movement of the sleeves and wheels mounted on the lower end portions of the combined handle and leg member and the leg member, and a spring catch mounted on the lower end portion of the frame of the combined handle and leg member and arranged for releasable engagement with the lower connecting portion of the U-shaped frame of the leg member for the purpose of releasably retaining the perambulator in a collapsed condition.

HAROLD JACK UNDERWOOD.

REFERENCES CITED

The following references are of record in the file of this patent:

UNITED STATES PATENTS

| Number | Name | Date |
|---|---|---|
| 457,006 | Nesom | Aug. 4, 1891 |
| 1,090,950 | Spofford et al. | Mar. 24, 1914 |
| 1,886,073 | Wood | Nov. 1, 1932 |
| 2,196,834 | Mahr | Apr. 9, 1940 |
| 2,322,931 | Gottfried | June 29, 1943 |

FOREIGN PATENTS

| Number | Country | Date |
|---|---|---|
| 4,776 | Norway | July 27, 1896 |
| 7,982 | Great Britain | Apr. 6, 1904 |
| 539,043 | France | Mar. 28, 1922 |
| 640,023 | France | Mar. 19, 1928 |